A. C. McCORD.
CAR COUPLING.
No. 11,220. Reissued Feb. 2, 1892.
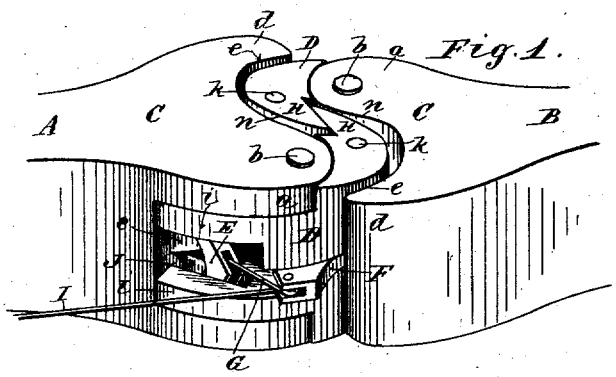
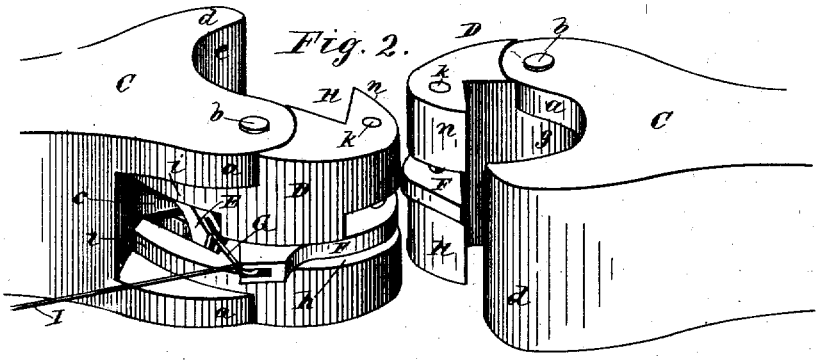
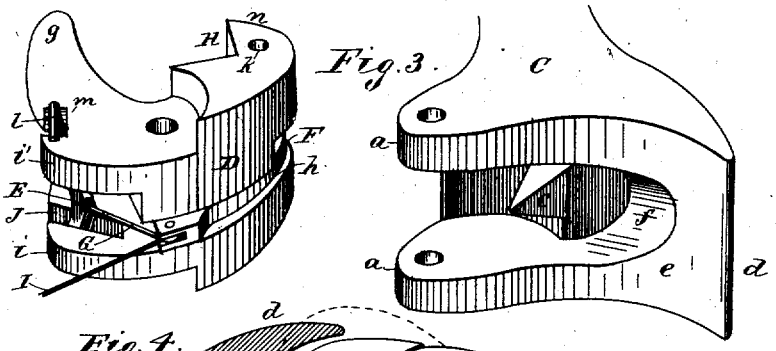
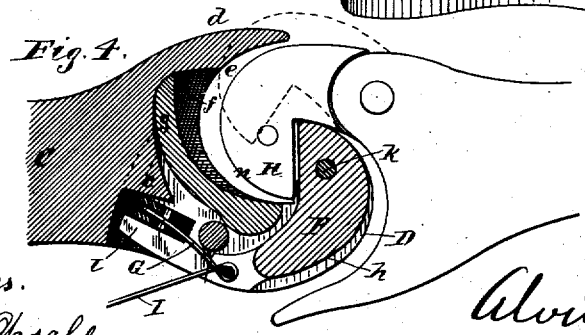
Witnesses.
A. H. Opsahl.
Frank D. Merchant.
Inventor.
Alvin Carr McCord
By his Attorney.
Jas. F. Williamson

UNITED STATES PATENT OFFICE.

ALVIN CARR McCORD, OF MINNEAPOLIS, MINNESOTA.

CAR-COUPLING.

SPECIFICATION forming part of Reissued Letters Patent No. 11,220, dated February 2, 1892.

Original No. 438,275, dated October 14, 1890. Application for reissue filed January 8, 1891. Serial No. 377,181.

*To all whom it may concern:*

Be it known that I, ALVIN CARR McCORD, a citizen of the United States, residing at Minneapolis, in the county of Hennepin and State of Minnesota, have invented a certain new and useful Improvement in Car-Couplings, of which the following is a specification.

My invention relates to car-couplings, and has reference more particularly to that class of devices in which there are employed two jaws similar in all respects to each other, which couple automatically as the cars are brought together; and the objects of my invention are, first, to secure a coupling automatic under all circumstances, whether both be open or both closed or one open and one closed, without previous adjustment or setting; second, to render the uncoupling of this possible without the necessity of passing between the cars and to render it possible to accomplish the same equally well from either side of the train; third, to secure the safe and secure coupling of all cars of even different standards between certain limits; fourth, to render this coupling capable, by the insertion of an ordinary link, of being used equally well with an ordinary bumper; fifth, in adjusting or setting this swinging head or beak for other couplings, as the case may require, to give complete control of this from the side of the car and render this possible without passing between the cars. I attain these objects by the mechanism illustrated in the accompanying drawings, in which—

Figure 1 is a perspective view of my improved coupler; Fig. 2, a similar view showing the jaws separated. Fig. 3 is a perspective view of the parts separated, and Fig. 4 a horizontal sectional view.

A and B indicate the two jaws, which are in all respects duplicates of each other, and as a description of one will apply equally well to both I will now describe in detail only the jaw A. The jaw comprises as its essential features a main body or head C, a pivoted catch or beak D, and a locking pin or dog E. The head or main body C will advisably be made of a single casting and will be provided with two forwardly-projecting ears or lugs *a*, perforated to receive the pin or bolt *b*, upon which the beak oscillates or swings. The beaks D have their pivotal points back of their centers.

In rear of and between the lugs or ears *a* the main body is provided with a lug or projection *c*, against which the dog E, carried by the pivoted beak, is designed to strike, so as to prevent the latter from swinging outward and uncoupling. On that side of the head or main body opposite the forwardly-projecting lugs the said head is provided or formed with a forwardly-projecting nose *d*, whose front face *e* is curved, as shown in Figs. 1, 2, 3, and 4, so that the beak of the opposite jaw will be thrown inward as it strikes and rides along the said curved face.

The front face of the main body C, or more properly its nose *d*, will be recessed or provided with a socket *f*, as shown in Figs. 3 and 4, to receive the tail *g* of the beak D. This pivoted beak is provided with a narrow slot *h*, extending from front to rear to receive a flat block F, which latter is held in place by a pin or pivot *k* at the forward end of the block. The beak is further provided with two rearwardly-extending arms *i i'*, which are separated to pass respectively above and below the lug or projection *c* on the main body or head C, the lower arm *i* being slotted lengthwise, as at *j*, to receive and embrace the lower end of the pivoted or swinging locking-dog E. The upper arm *i'* is provided on its upper face with sockets or bearings *m* to receive the laterally-projecting journals *l*, formed upon the upper end of the dog E, and upon which the latter oscillates, and the said arm is cut away, as shown, to permit the swinging of the dog. The block F has a beveled nose and is pivoted in advance of its center, preferably at or near its angle. When in its normal position and the beaks are closed, the nose of the block F projects outward slightly beyond the nose of the beaks.

The dog E is connected with the inner end of the block F by means of a link G, so that when the end of the block F (which projects beyond the beveled nose or front edge *n* of the hook H of the beak) is struck by the corresponding block F or beak D of the opposite jaw it will rock upon its pivot *k*, and in thus rocking draw the lower end of the locking-dog E forward in advance of the lug *c*. A rod I, connected to the block F, extends outwardly to the side of the car, so that the said block and the locking-dog may be actuated or controlled without entering between the cars. This rod I, it should be noted, is connected both to the beak through the block F and to the locking-dog E, and its connection to the beak is at a point in advance of the beak's pivot. Hence it constitutes a manual or hand device for both releasing or unlocking the beak and opening the same by a single action—*i. e.*, a pull on the rod. Hence, with reference to this function only, the block F may be treated as simply a connection from the rod to the beak.

When the jaws are in the position shown in Fig. 4, the hooks H of the respective jaws will be in engagement with each other, and it will be seen that unless the hooks be locked in position they will be free to swing upon their pivots *b*, and thus uncouple. It is to prevent the uncoupling, or rather to lock the hooks in this position, that I employ the locking-dog E. This dog, which is carried by the arms *i i'* of the beak D, is adapted to come into contact with the lug or projection *c* on the head or body C, and thereby prevent the beak from swinging upon its pivot *b*. Now when the dog E is swung or moved forward beyond the end of the lug or projection *c*, so that the latter may be passed or cleared by the dog, the beak is free to be swung upon its pivot *b*, as shown by dotted lines in Fig. 4. This movement of the dog may be effected, as before stated, either through the actuation of the rod I or by means of the block F. The tendency of the dog is to remain in a vertical position, and whenever the means employed for throwing its lower end forward are released gravity will return the dog to its normal position. The back face of the lug or projection *c* is beveled or inclined, and the rear face of the dog is also advisably inclined, so that when the beak D swings into its closed position the dog will be caused to ride up the inclined face of the lug and over the end of the latter.

The jaws may be automatically coupled when either or both of the beaks are locked or unlocked, as will be now explained.

*First. When one of the beaks is locked.*—Assuming that the beak of jaw A is locked and that the beak of jaw B is unlocked, it will be seen that as the two jaws are brought together the tail of the beak of jaw B will strike the nose of the beak of jaw A at the same time that the nose of the beak of jaw B strikes the nose-piece *d* of jaw A, and it will also be seen that (if the movement of the jaws toward each other be continued) the riding of the beak of the jaw B along the curved nose-piece *d* and the pushing inward of the tail of the beak of jaw B will cause the said beak to swing inward and engage the beak of the jaw A. In thus swinging, the locking-dog is retracted, as before explained, and by the time that the beak has reached its proper position the dog will have passed over the end of the lug and behind the same and thereby locked the beak in position.

*Second. Where both beaks are locked.*—In this contingency it will of course be necessary that one or both of the hooks yield or give to allow the other to pass, and to secure this I employ the blocks F, which project beyond the beveled noses *n* of the hooks H of each beak D. Now when the beaks come together the inclined faces *n* will strike the projecting ends of the blocks, rock said blocks upon their pivots *k*, and through the links G actuate the dogs E and release the beaks, so that they may swing upon their pivots *b*, which they will do in virtue of the location of the pivots back of their centers, under the cam-like action of their beveled noses on each other. As the movement of the jaws toward each other continues, the nose-piece *d* of each jaw, acting in conjunction with the beak of the opposite jaw, throws the beaks inward toward and into engagement with each other, the beaks automatically locking themselves in position as before.

*Third. When both beaks are unlocked.*—The action that takes place here is just like that which takes place under the arrangement last-above described after the beaks have been released, so that they might swing outward to pass each other.

One of the principal advantages of the present construction lies in the fact that as the beveled noses of the beaks come together either one or both of said beaks will be deflected laterally to allow the other to pass and after passing to automatically come into engagement, the unlocking to permit the lateral movement of the hooks and the locking of the hooks being also performed automatically.

In order to adapt the jaws for use in connection with cars having the common form of coupling, I cut away a portion of the nose or hook of each beak just above the end of the block F, as shown, to receive the coupling-link, the pin *k* in such case serving as the ordinary coupling-pin.

Having thus described my invention, what I claim is—

1. In combination with head C, pivoted beak D, locking-dog E, carried by the beak to engage the head, and a block F, projecting beyond the nose of the beak and connected with the dog, all substantially as shown and described.

2. In combination with head C, having lug *c* and perforated ears *a*, beak D, having arms *i i'* and pivoted to the ears *a*, and dog E, supported by the arms *i i'*, all substantially as shown and described.

3. In combination with head C, having lug *c*, perforated ears *a*, socket *f*, and curved nose *d*, the pivoted beak D, having arms *i i'*, tail

*g*, and locking-dog E, all substantially as described.

4. In combination with head C and pivoted beak D, a gravitating dog E, arranged, substantially as shown, to engage the head.

5. In combination with head C, having beveled lug *c*, pivoted beak D, provided with dog E.

6. In combination with head C, having lug *c*, pivoted beak D, having arms *i i'*, sockets *m m*, formed in arm *i'*, a slot *j*, formed in arm *i*, and dog E, having lateral arms or journals *l*.

7. In combination with head C, pivoted beak B, provided with a slot *h*, a block F, pivoted in the slot, a locking-dog E, and a connection between the dog and block.

8. In combination with head C, pivoted beak D, having block F and dog E, a connection between the dog and block, and a rod I, extending outward from the block, all substantially as described.

9. In combination with head C, beak D, provided with locking-dog E, block F, and a slot *h*, enlarged at its forward end to receive a link, and a pin *k* for the block, adapted to serve also as a coupling-pin.

10. In a twin car-coupler, the combination, with the pivoted beaks and automatic locking-dogs, of an unlocking or release device also carried by the beak, operated by the opposing draw-heads to open the beaks and permit them to couple, substantially as described.

11. In a car-coupler, the combination, with the main head and the pivoted beak, of a lug fixed to the head, a locking-dog pivoted to the beak, adapted to engage with said lug for locking the beak in its closed position, and a hand device extending outward toward the side of the car, having a connection with the dog and another connection with the beak at some point forward of its pivot for releasing the dog and opening the beak by one and the same action, substantially as described.

ALVIN CARR McCORD.

In presence of—
D. W. McCORD,
H. E. ALEXANDER.